SERIAL-ENTRY SERIAL-ACCESS MEMORY DEVICE

Filed Nov. 23, 1966 4 Sheets-Sheet 1

INVENTORS.
WILLIAM D. MURRAY
ROBERT A. TRACY
BY Edward J. Feeney Jr.
ATTORNEY

SERIAL-ENTRY SERIAL-ACCESS MEMORY DEVICE

Filed Nov. 23, 1966

INVENTORS.
WILLIAM D. MURRAY
ROBERT A. TRACY
BY
Edward J. Feeney Jr.
ATTORNEY

INVENTORS
WILLIAM D. MURRAY
ROBERT A. TRACY
BY
Edward J. Feeney Jr.

INVENTORS.
WILLIAM D. MURRAY
ROBERT A. TRACY

BY Edward J. Feeney Jr.
ATTORNEY 3,534,340
SERIAL-ENTRY SERIAL-ACCESS MEMORY DEVICE

William D. Murray, Franklin, Mich., and Robert A. Tracy, Castro Valley, Calif., assignors to Burroughs Corporation, Detroit, Mich., a corporation of Michigan Filed Nov. 23, 1966, Ser. No. 596,707
Int. Cl. G11c *11/04, 11/06, 11/14*
U.S. Cl. 340—174 10 Claims

ABSTRACT OF THE DISCLOSURE

A non-mechanical magnetic memory device is presented which is capable of sequentially storing a plurality of information bits and also of non-destructively interrogating the bits so stored in a sequential manner. The device illustrated utilizes the magnetic field emanating from a traveling domain wall along an elongated magnetic member to scan a plurality of adjacent magnetic storage elements. To write into the storage elements, the scanning magnetic field is used in conjunction with successive bidirectional information signals which are sequentially applied to the rod. Reading of the storage information is accomplished by the scanning field above. Thus, it is a memory device which operates without mechanical motion, whose speed, capacity and performance characteristics compare favorably with mechanically moving systems such as tape, drum or disk memories.

The present invention relates to magnetic memory devices. More particularly, it relates to a magnetic memory device capable of being used in a non-mechanical memory system whose speed, capacity and performance characteristics compare favorably with mechanical systems such as tape, drum or disc memories.

The advantages available with many mechanically operated memories, such as large storage capacity, removable storage media and low storage cost, are largely offset by the disadvantages of mechanical motion inherent in such systems. The close tolerances required between the scanning and the storage means as well as the physical tolerances imposed upon the scanning means itself provide ample opportunity for mechanical breakdown, and such difficulties are frequently encountered.

Briefly, the present invention includes a magnetic memory media which is interrogated by the perturbation caused by the field of a traveling domain wall and which is written into by a coincidence of this domain wall field and a current generated magnetic field at a given memory media location.

It is therefore an object of this invention to provide a device which may be utilized to create a memory system having many of the advantages of mechanical memory systems without any of the disadvantages of mechanical motion.

It is also an object of this invention to provide a magnetic memory device capable of storing a plurality of information bits and capable of nondestructively interrogating the contents of the device in a sequential manner without mechanical motion.

It is still a further object of the present invention to provide a non-mechanical memory device which utilizes a traveling domain wall to accomplish nondestructive sequential interrogation of an adjacent storage media.

It is also an object of the present invention to provide a memory device wherein a traveling domain wall rod is utilized to bi-directionally interrogate an adjacent storage media.

These and other objects and features of the present invention will become apparent from the following description when taken in conjunction with the accompanying drawings in which.

Figure 5A:
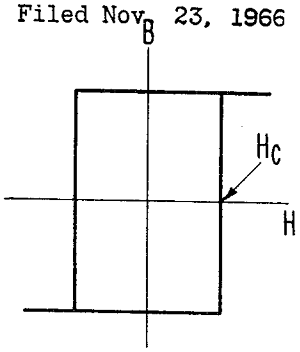
Figure 5B:
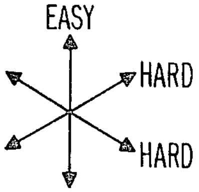
Figure 5C:
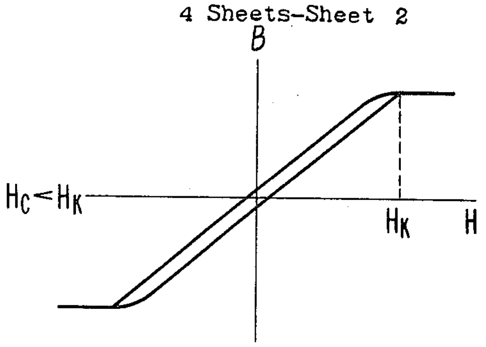
Figure 6:
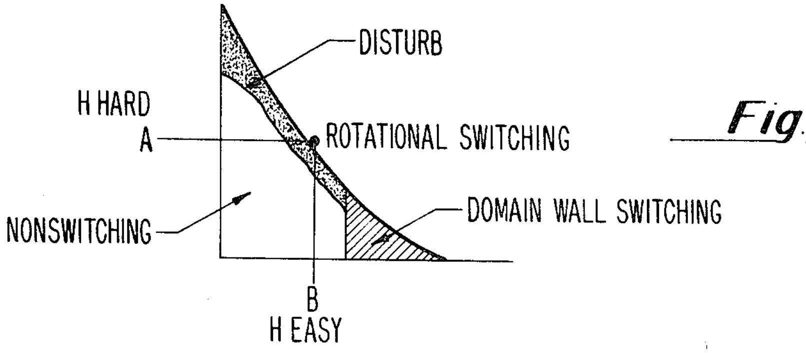
Figure 7:
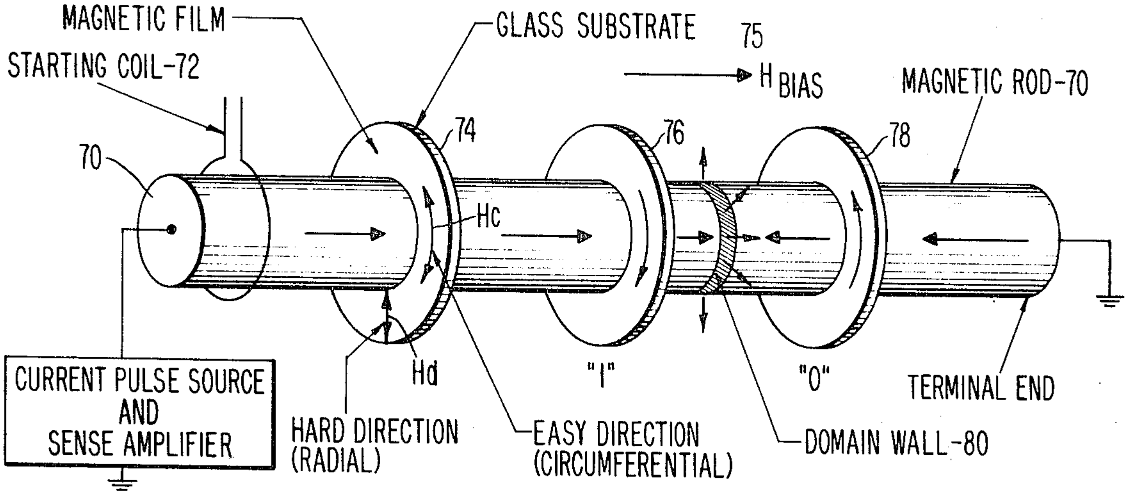
Figure 8A:
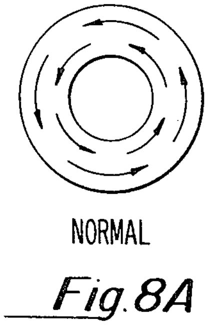
Figure 8B:
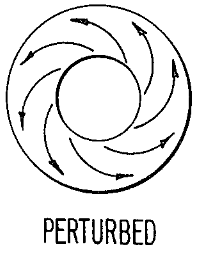
Figure 9:
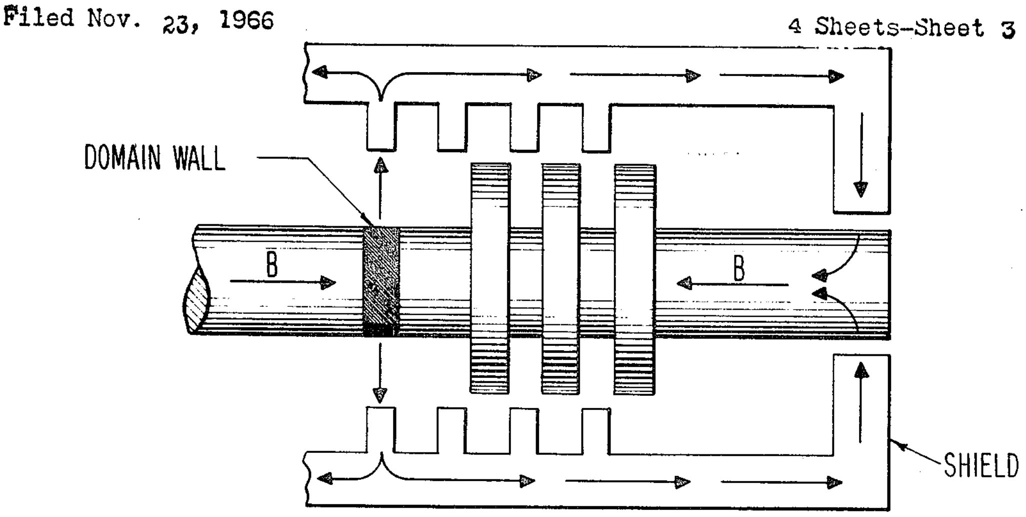
Figure 10:
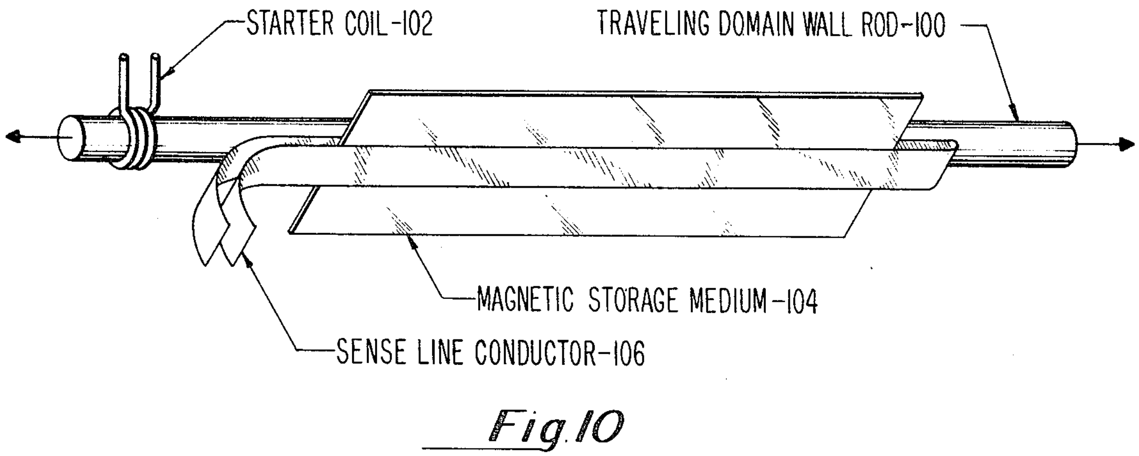
Figure 11:
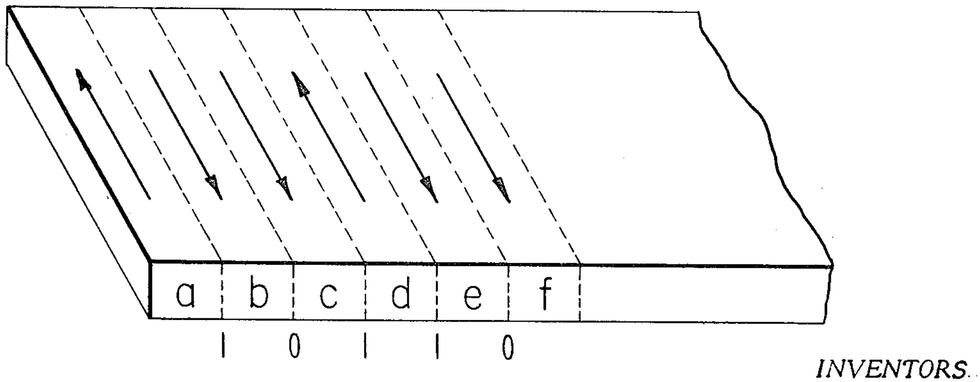
Figure 12A:
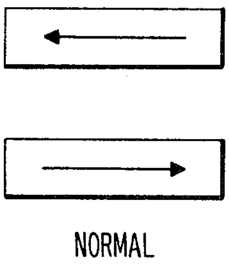
Figure 12B:
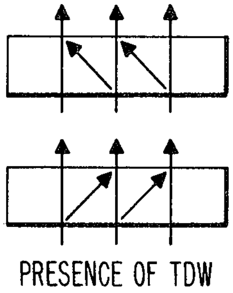
Figure 12C:
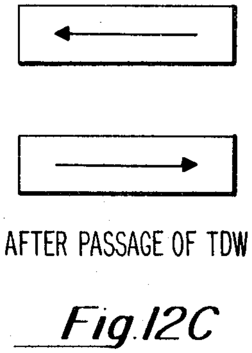
Figure 13:
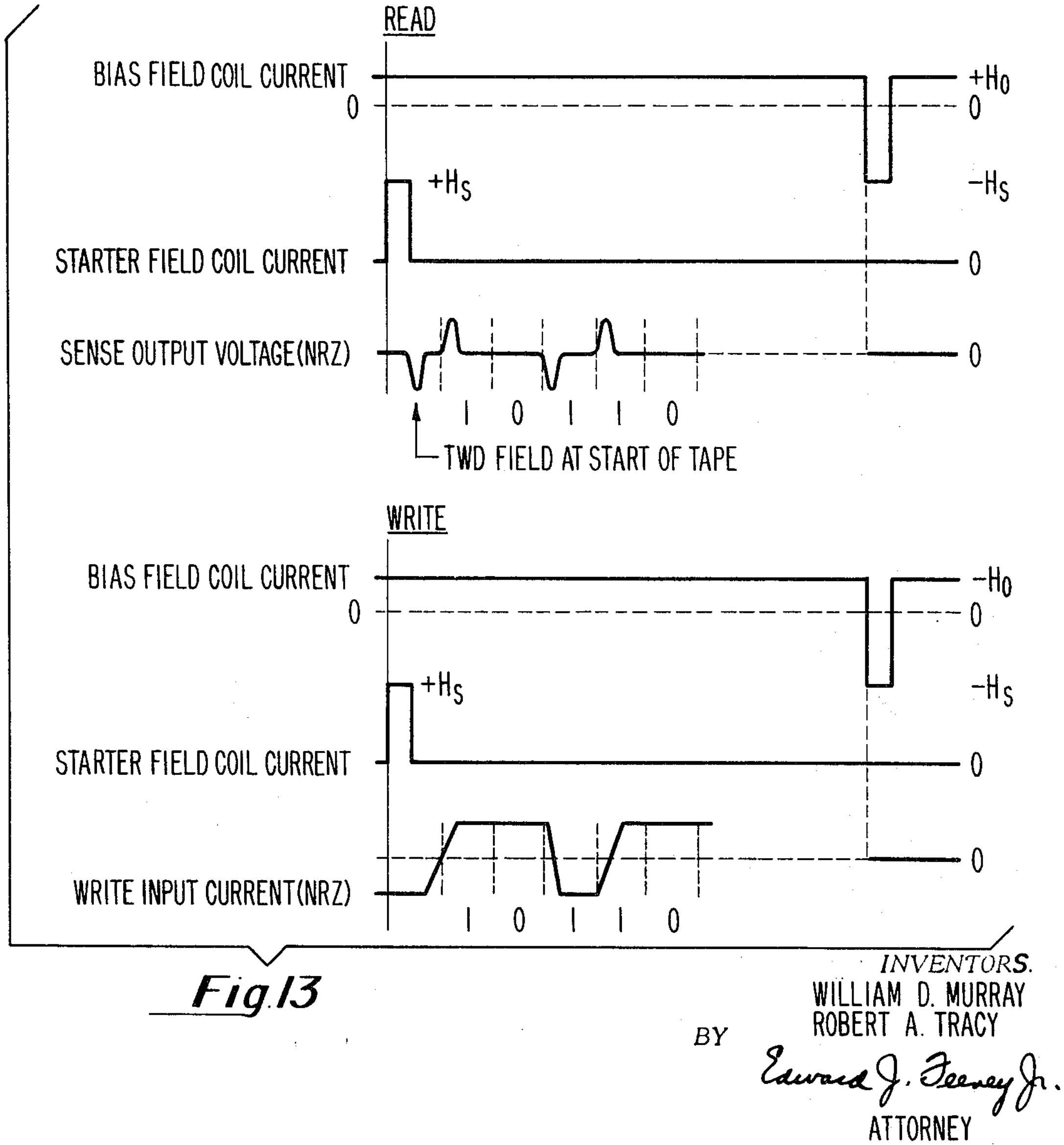

FIGS. 5A, 5B, and 5C illustrate the hysteresis properties of a magnetic storage media such as, for example, 82 Permalloy films. These films have a magnetically established anisotropy which provides one easy and two hard directions of magnetization as shown in FIG. 5B;

FIG. 6 illustrates the switching characteristics of the magnetic film under easy and hard direction fields;

FIG. 7 illustrates one preferred embodiment showing the structural combination of the magnetic rod and a plurality of magnetic thin-film wafers;

FIGS. 8A and 8B respectively show a magnetic thin-film wafer in its normal and perturbed conditions of magnetization;

FIG. 9 illustrates a return path shield placed over the rod/wafer structure of FIG. 7 which provides the return path for the domain wall flux;

FIG. 10 illustrates an alternate embodiment of the present invention which provides a single continuous strip as the magnetic storage medium rather than the plurality of circular storage wafers illustrated in FIG. 7;

FIG. 11 shows a typical magnetization state of the storage medium of FIG. 10;

FIGS. 12A, 12B, and 12C respectively illustrates the magnetic condition of the storage medium before, during and after it has been scanned by the traveling wall domain;

FIG. 13 illustrates a plurality of operational pulse waveforms of the memory unit shown in FIG. 10.

The following description, therefore, relates to a serial entry, serial access memory device. Two embodiments are illustrated. One comprises a traveling domain wall rod with a plurality of magnetic thin film wafers positioned sequentially along the rod. A current pulse source and a sense amplifier are commonly connected to the magnetic rod for reading and writing on the plurality of wafers. The second embodiment also comprises a Traveling Domain Wall rod; however, the magnetic memory media is in the form of a continuous strip positioned adjacent to the rod and a separate sense/write conductor is located between the rod and the media.

Figure 1:
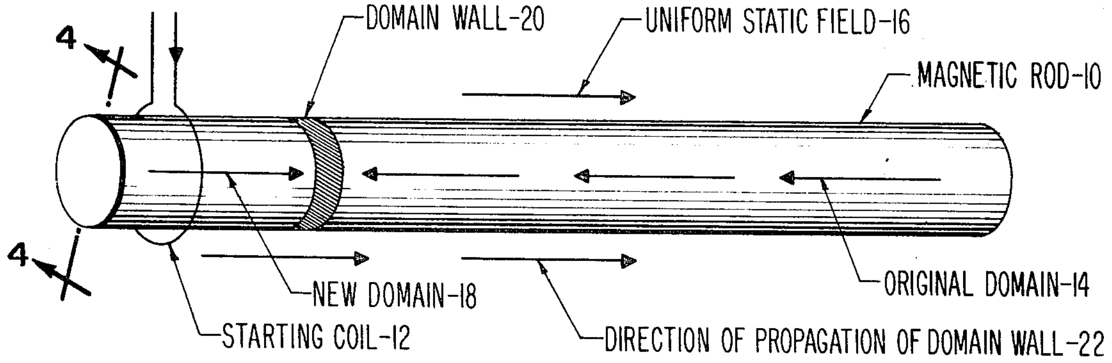
FIG. 1 is an illustration of the traveling domain wall rod.

Referring in particular to FIG.1, there is shown the basic magnetic rod 10 through which the traveling domain wall 20 is propagated. In operation, if the rod 10 has an original magnetic domain 14, then a domain wall can be made to traverse from one end of a magnetic rod or wire to the other end, at speeds of 400 meters per second or higher. For example, see the publication entitled "Ferromagnetism" by Bozarth, pp. 494–498. This traversal is experimentally accomplished by placing the rod of magnetic material 10 under tension and originally magnetizing it in the direction of domain 14. When a uniform magnetic field 16 of insufficient magnitude to switch the rod 10 is applied in the opposite direction, nothing will occur until a new domain 18 is created, forming a domain wall or interface between the original domain 14 and the new domain 18. Thereafter, this new domain wall will propagate through the rod until it is saturated in this new direction 22.

Figure 2:
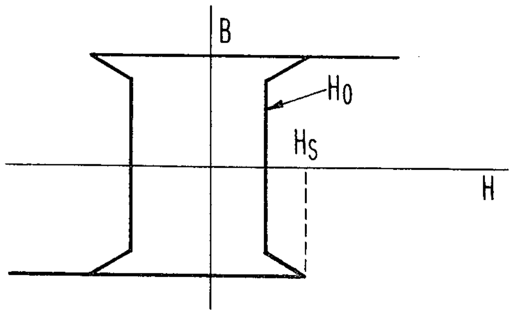
FIG. 2 is a characteristic hysteresis loop of a representative material in which the traveling domain phenomena occurs.
Figure 3A:
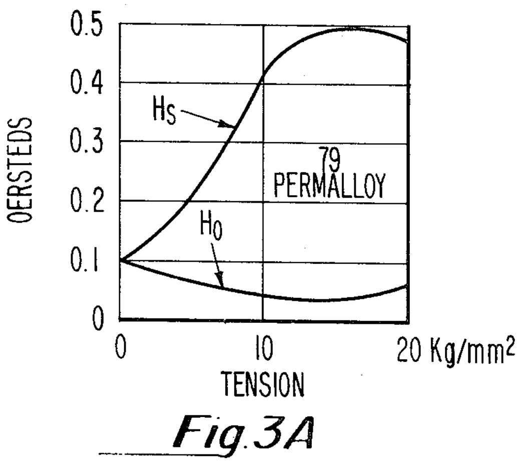
FIGS. 3A and 3B illustrate the graphic relationship between H*o*, H*s* and Tension in two materials, namely, 79 Permalloy and 14 Ni-Fe respectively.
Figure 3B:
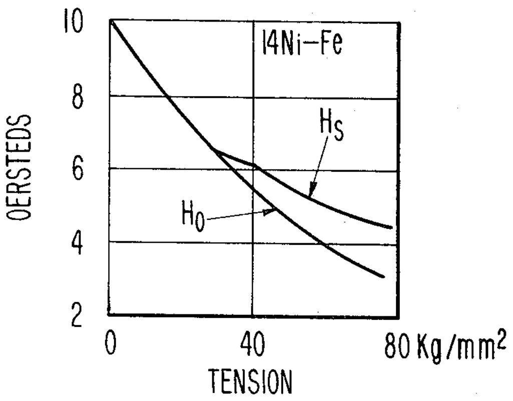

Permalloy 79 is a good example of the many materials in which this phenomenon occurs. The hysteresis loop of this material under tension is illustrated in FIG. 2. It shows a threshold characteristic curve wherein the creation of a domain of opposite magnetization requires a field equal to or greater in magnitude than H*s*. However, the propagation of an existing domain wall requies a field of H*o* or greater. Thus, a field greater than H*o* but less than H*s* will cause the propagation of an existing domain wall without creating a new domain. The relation between H*o*, H*s* and tension for 79 Permalloy is shown in FIG. 3A. Consideration of this relationship with that shown in FIG. 3B for 14 Ni-Fe reveals the substantial differences between the two materials. In addition, it also illustrates the definite affinity for this application possessed by 79 Permalloy.

Figure 4:
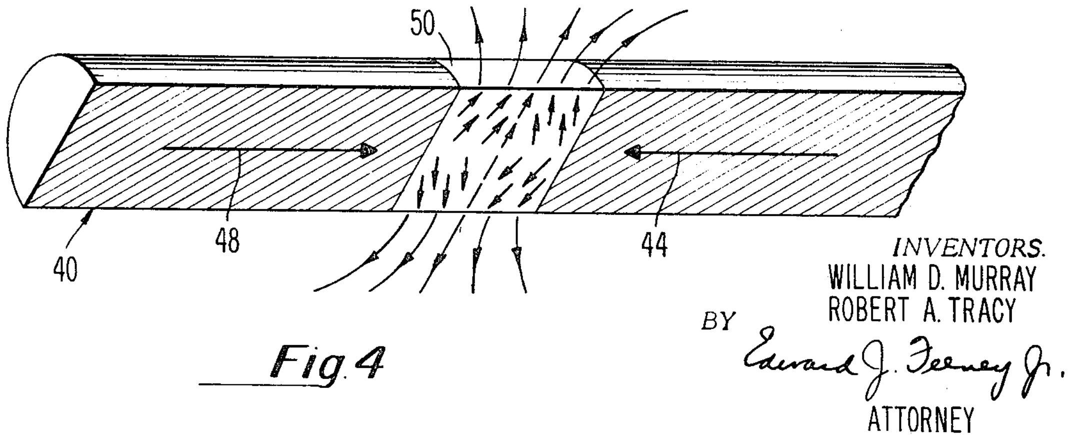
FIG. 4 illustrates a cross-sectional view of the nature of a domain wall in a magnetized rod of the suggested material.

Consider next, FIG. 4, wherein the nature of a domain wall 50 in a rod magnetized as described, is shown in cross-section. A large flux density exists at the surface at the domain wall. This magnetic field is directed radially outward from the center of the rod.

The domain wall 50 has a width of approximately 5000 angstroms (A.). In 79 Permalloy, for example, the flux at the surface of the rod would be about 7000 gauss. A short distance away from the rod 40 the field will have dropped to a few oersteds.

A storage medium discussed later utilizes characteristics found, for example, in 82 Permalloy. Films made from this material have a magnetically established anisotropy which provides an easy and two hard directions of magnetization as shown graphically in FIG. 5.

The switching characteristics under easy and hard direction fields are shown in FIG. 6. Consideration of this figure shows that a field in the horizontal or easy direction of value B will not disturb the film unless a vertical or hard direction field of value A or greater accompanies it. Conversely, a vertical or hard direction field of value A will not, be itself, disturb the static memory state.

As will be discussed later in conjunction with an alternate configuration, somewhat similar properties are obtainable in bulk and strip or tape materials by cold rolling and annealing procedures, by magnetic annealing, and by application of magnetic fields during forming processes such as electroplating or deposition.

The desired characteristics may also be achieved by these techniques in the member carrying the domain wall when it is configured in other geometries, such as tubes, tapes or flat bars.

Consider now the structure shown in FIG. 7. It includes with its starting coil 72, a plurality of magnetic thin-film wafers 74, 76, and 78. This combination comprises the basic memory cell of this invention. To read the influence of the bias field $H_{BIAS}$ 75, the domain wall started by a current pulse in the starting coil 72 and, under the influence of the bias field $H_{BIAS}$ 75, the domain wall 80 travels down the rod 70. As the domain wall passes a magnetic film element 74, the element is subjected to H*d* (the wall field) in the hard direction (radially). As shown in greater detail in FIGS. 8A and 8B, this perturbs (8B) the magnetization of the film from its normal condition (8A). However, it does not destroy or "permanently disturb" the magnetic state.

For purposes of definition, information stored in the clockwise direction of the wafer 76, when disturbed, generates a voltage along the rod which is negative on the starting end and positive on the terminal end. This is denoted a "1." Conversely, information stored in the counter-clockwise direction, as shown in the wafer 78, generates a voltage across the rod 70 of opposite polarity and this stored information is denoted a binary "0". As the domain wall 80 traverses the rod 70 all magnetic film elements 74, 76, and 78 are serially nondestructively perturbed or read.

To store information (write) in a specific one of the magnetic film elements 74, 76 or 78, the coincidence of a circumferential field H*c* and a radial field H*d* are required. This is achieved by sending a current pulse down the rod, (for example, positive to store a "1," negative to store a "0") at the same time the domain wall is passing the specific film in which it is desired to store the binary information. Thus, a series of current pulses from the current pulse source connected to the left hand end of the rod 70 during the traversal of the domain wall will serially enter (write) information into the thin-film wafers 74, 76, and 78.

After the domain wall 80 has traveled the length of the rod 70 the magnetic state of the entire rod must be reset. This is accomplished by reversing and increasing $H_{BIAS}$ field 75 sufficiently to reorient the domain, or a reverse coil could be utilized with a reverse current pulse in conjunction with a reversed $H_{BIAS}$ field. It would also be possible to reverse the direction of the domain wall by reversing the $H_{BIAS}$ field at an appropriate time.

With such a memory device some useful capabilities are immediately apparent. For instance, the speed of the domain wall can be controlled by the $H_{BIAS}$ field to provide variable data rate and thus perform buffering operations. Also, by reversing $H_{BIAS}$ field and causing the domain wall to move from terminal to starting end, the data can be read in reverse order.

Also, the domain wall motion can be reversed at any position in the rod. This would provide an operation similar to a mechanical motion reversal in a magnetic tape memory system.

Using 8-mil thick glass substrates stacked on a rod in the configuration shown in FIG. 7, a pulse packing density of 125 bits per inch is achieved. Thick (10,000 A.) films are used to improve the signal level, since the easy direction magnetic path is a closed circuit. At 125 bits per inch and a domain wall speed of 240 meters per second, the data rate is 1.17 megacycles.

One of the factors which may offset the full capabilities of this unit is the spreading of the domain wall field. To prevent this, a shield-like structure is mounted over the rod thin-film unit. This shield provides a return path for the domain wall flux. Such a configuration is illustrated in FIG. 9. The use of this shield will focus the field as shown in the figure. The $H_{BIAS}$ coil is then inserted between the laminations.

A second embodiment of the present memory device is shown in FIG. 10. This configuration includes a Traveling Domain Wall (TDW) rod 100 with a starter coil 102, a strip of magnetic memory media 104, and a sense-write conductor 106.

In this embodiment, the storage media 104 has hard magnetic directions along the axis of the rod 100 and in the thickness dimension of media 104, while the easy direction is transverse to the axis of the rod. As the domain wall traverses the rod 100 it applies a field to the storage media 104 in a radial direction sequentially along the storage tape medium. Consider the magnetization state shown in FIG. 11 as being the present state of the medium in FIG. 10.

Perturbation of a given magnetic state is caused as the domain wall passes. This effect is pictorially illustrated in FIGS. 12A, 12B, and 12C. As shown, the figures represent the normal state, the state during the presence of domain wall and the state after the wall has passed.

This rotation, radially outward from the rod, presents a change in flux linking the sense conductor only when a transition region is encountered, as in going from position *a* to position *b* on the storage medium shown in FIG. 11. However, since no change exists between position *b* and position *c*, no signal is generated. When a change is present, this transition generates a voltage on the sense line in one direction (positive) when the transition is from *a* to *b* and in the opposite direction (negative) for that from *c* to *d*.

In the configuration of FIG. 10 writing is accomplished by a combination of the traveling domain wall field and the field due to current in the sense-write conductor 106. Thus, when the B vector is raised to an angle of 45°, as in reading, and accompanied by an easy direction field in the opposite direction to its previous state, then the magnetic vector will switch to that opposite state. This switching is routinely accomplished in thin magnetic films and has been observed in anisotropic tape materials.

The pulse waveforms associated with the memory unit shown in FIG. 10 are diagrammed in FIG. 13. In the upper group of waveforms denoted "READ," a bias field coil current exists and remains at a magnitude +H*o* when the starter field coil current, shown immediately below, is pulsed positively to a magnitude equal to +H*s*. This starting pulse initiates the propagation of a traveling domain wall down the rod 100. With the magnetic state of the medium 104 as denoted in FIG. 11, the successive output signals sensed in the next lower waveform, correspond to the respective states of the magnetic media. Thus, a 1, 0, 1, 1, 0 are read from the media by the passage of the domain wall.

Similarly, the lower group of waveforms shown in FIG. 13 labeled "WRITE" correspond to the input currents necessary to write the respective signals upon the media. Thus, as the domain wall travels down the rod, a write current is coincidentally applied to the successive segments to write into that segment the binary information.

While there have been shown and described and pointed out the fundamental novel features of the invention as applied to the preferred embodiments, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A serial-entry, serial-access memory device comprising a magnetic medium capable of propagating an initiated traveling wall domain field, a continuous portion of magnetic thin-film storage media adjacently positioned to said medium, a starter coil inductively coupled to said medium, a sense-write conducting means encircling said media and passing between said magnetic medium and said storage media, a sensing means and a writing source means alternatively connected to said sense-write conducting means to selectively provide a read and a write operation, and said memory device also including a tensioning means and a magnetic field bias source associated with said magnetic medium to thereby provide domain saturation of said medium in a first direction.

2. A serial-entry, serial access memory device comprising an electrical conducting rod with a magnetic coating thereon capable of propagating an initiated traveling wall domain field, means connected to said rod for initiating a traveling wall domain therealong, a plurality of doughnut-shaped magnetic wafers physically positioned along and encircling said conducting rod, each of said wafers capable of storing a binary digit, a binary pulse source writing means connected to said conducting rod for applying thereto during a writing operation successive binary information pulses which are synchronously timed with the promulgated speed of said traveling wall domain to enable the simultaneous presence of one of said binary information pulses and said traveling domain wall to serially enter and sequentially store a binary digit at successive wafers positioned along said rod and a read sense means for connection to said conducting rod during a reading operation to successively sense the identity of the binary digit stored in each of the respective wafers as the passage of said traveling wall domain field non-destructively perturbs each stored digit.

3. The memory device as set forth in claim 2 wherein said rod is positioned association with tensioning means and includes a uniform magnetic field source capable of applying a uniform magnetic field which is in an opposite direction to the original domain field in said rod and of a magnitude insufficient to switch the domain of the rod.

4. A serial-entry, serial-access memory device comprising a magnetic rod capable of propagating an initiated traveling wall domain field, starting coil means indictively connected to said rod for initiating a traveling wall domain field therealong a plurality of magnetic wafers positioned along said rod each capable of storing binary digits of information, a write pulse source means connected to said rod for aplying thereto successive binary information pulses which are synchronously timed with the speed of said traveling wall domain field to enable one of said binary information pulses and said traveling wall domain field to be simultaneously present at successive wafers positioned along said rod and a read sense means alternately connected to said rod with said source means to successively sense the binary value of the information stored in each of the wafers as the traveling wall domain field passes each of the respective wafers.

5. The memory device as set forth in claim 4, wherein said magnetic rod is comprised of material having magnetic characteristics enabling successive portions of it to be sequentially switched in a reverse direction by the passage of a domain wall field equal in magnitude to H*o* after it has been magnetized in an opposite direction by a magnetic field equal in magnitude to H*s* wherein $Hs>Ho$.

6. The memory device as set forth in claim 4, wherein said magnetic wafers are circular in configuration with said magnetic rod passing through the center of each wafer.

7. The memory device as set forth in claim 6, wherein said magnetic rod is conected to a tension applying means and placed in a magnetic field which supplies a bias field thereto.

8. The memory device as set forth in claim 6, wherein each of the circular magnetic wafers is comprised of a glass substrate having a magnetic thin-film material coated thereon.

9. The memory device as set forth in claim 8, wherein each of the circular magnetic thin-film wafers is coated with a magnetic material having a first and a second easy direction in opposite directions about its circumference and a hard direction radially from its center.

10. A serial-entry, serial-access memory device comprising an electrical conducting rod with a magnetic coating thereon capable of propagating an initiated traveling wall domain field, means connected to said rod for initiating a traveling wall domain field therealong, a plurality of magnetic wafers positioned along said conducting rod each capable of storing a binary digit, a binary pulse source writing means connected to said conducting rod for applying thereto successive binary information pulses which are synchronously timed with the speed of said traveling wall domain field to enable one of said binary information pulses and said traveling wall domain field to be simultaneously present at successive wafers positioned along said rod, a read sense means also connected to said conducting rod to successively sense and identify the binary digit stored in each of the wafers as the traveling wall domain field passes each of the respective wafers and a shielding return means which provides a common magnetic coupling between each of said magnetic wafers and said magnetic rod whereby the spreading of the traveling wall domain field along said rod is substantially restricted.

References Cited

UNITED STATES PATENTS

| | | | |
|---|---|---|---|
| 3,069,661 | 12/1962 | Gianola | 340—174 |
| 3,140,471 | 7/1964 | Fuller | 340—174 |
| 3,151,316 | 9/1964 | Bobeck | 340—174 |
| 3,295,114 | 12/1966 | Snyder | 340—174 |
| 3,148,360 | 9/1964 | Hale | 340—174 |

JAMES W. MOFFITT, Primary Examiner

PO-1050
(5/69)

UNITED STATES PATENT OFFICE
CERTIFICATE OF CORRECTION

Patent No. 3,534,340 Dated October 13, 1970

Inventor(s) William D. Murray and Robert A. Tracy

It is certified that error appears in the above-identified patent and that said Letters Patent are hereby corrected as shown below:

Column 3, line 53, delete "the influence of bias field $H_{BIAS}$ 75, the" and substitute therefor -- the information stored in the cell, --;

line 53, before "domain" insert -- a --;

line 53, after "wall" insert -- 80 --.

SIGNED AND
SEALED
FEB 2 1971

(SEAL)
Attest:

Edward M. Fletcher, Jr.
Attesting Officer

WILLIAM E. SCHUYLER, JR.
Commissioner of Patents